(12) United States Patent
Fu et al.

(10) Patent No.: US 10,966,122 B2
(45) Date of Patent: Mar. 30, 2021

(54) METHOD AND MIGRATION MANAGING MODULE FOR MANAGING A MIGRATION OF A SERVICE

(71) Applicant: Telefonaktiebolaget LM Ericsson (publ), Stockholm (SE)

(72) Inventors: Jing Fu, Solna (SE); Xiaoyu Lan, Täby (SE); Liyi Meng, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 98 days.

(21) Appl. No.: 16/466,795

(22) PCT Filed: Dec. 7, 2016

(86) PCT No.: PCT/SE2016/051226
§ 371 (c)(1),
(2) Date: Jun. 5, 2019

(87) PCT Pub. No.: WO2018/106162
PCT Pub. Date: Jun. 14, 2018

(65) Prior Publication Data
US 2019/0342797 A1    Nov. 7, 2019

(51) Int. Cl.
*H04W 28/24* (2009.01)
*H04L 12/24* (2006.01)
(Continued)

(52) U.S. Cl.
CPC ......... *H04W 28/24* (2013.01); *H04L 41/5009* (2013.01); *H04L 41/5025* (2013.01);
(Continued)

(58) Field of Classification Search
CPC ............. H04W 28/24; H04W 41/5009; H04W 41/5025; H04W 41/5051; H04W 24/04;
(Continued)

(56) References Cited

U.S. PATENT DOCUMENTS 9,288,148 B1    3/2016 Krishnaswamy et al.
10,299,171 B2 *  5/2019 Yadhav ................ H04W 36/08
(Continued)

FOREIGN PATENT DOCUMENTS

WO    2015084230 A1    6/2015
WO    2016126178 A1    8/2016

OTHER PUBLICATIONS

Gomes A.S., et al., "Edge Caching with Mobility Prediction in Virtualized LTE Mobile Networks," Future Generation Computer Systems, Elsevier Science Publishers, vol. 70, Jun. 28, 2016, pp. 148-162.
(Continued)

*Primary Examiner* — Curtis A Alia
(74) *Attorney, Agent, or Firm* — NDWE LLP

(57) ABSTRACT

A method and a migration managing module for managing a migration of a service. The migration managing module determines a point in time relating to completion of the migration of the service based on resource requirements related to the service. For each radio network node a respective impact on a quality of the service is estimated. Moreover, the migration managing module selects from among servers at least one respective target server for which the respective server location measure of said at least one respective target server matches the respective radio network node location measure of said each radio network node, thereby obtaining a set of target servers comprising said at least one respective target server for said each radio network node. For each target server, a respective cost of the migration based on the resource requirements related to the service is determined. A respective tendency as a function of said each probability value, the respective cost and the respective impact is determined. A target server of the set of target servers based on tendencies is selected. The migration of the service from the source server to the target server is
(Continued)

performed. A computer program and a carrier therefor are also disclosed.

24 Claims, 4 Drawing Sheets

(51) Int. Cl.
  *H04W 24/04* (2009.01)
  *H04W 36/16* (2009.01)
  *H04W 36/22* (2009.01)
  *H04W 36/38* (2009.01)

(52) U.S. Cl.
  CPC ......... *H04W 24/04* (2013.01); *H04W 36/165* (2013.01); *H04W 36/22* (2013.01); *H04W 36/385* (2013.01)

(58) Field of Classification Search
  CPC .. H04W 36/165; H04W 36/22; H04W 36/385
  See application file for complete search history.

(56) References Cited

U.S. PATENT DOCUMENTS

| | | | | |
|---|---|---|---|---|
| 2012/0164972 | A1* | 6/2012 | Shim | H04W 24/02 455/405 |
| 2015/0257070 | A1* | 9/2015 | Zhao | H04W 36/22 370/331 |
| 2016/0080172 | A1 | 3/2016 | Uberoy et al. | |
| 2016/0255543 | A1* | 9/2016 | Yadhav | H04L 67/148 370/331 |

OTHER PUBLICATIONS

International Search Report and Written Opinion for Application No. PCT/SE2016/051226, dated May 17, 2017, 13 pages.
Satria T.A., et al., "Performance Evaluation of ICN/CCN Based Service Migration Approach in Virtualized LTE Systems," 2014 IEEE 3rd International Conference on Cloud Networking (CloudNet), Oct. 8, 2014, pp. 461-467.
Taleb T., et al., "An Analytical Model for Follow Me Cloud," 2013 IEEE Global Communications Conference (GLOBECOM), Dec. 9, 2013, pp. 1291-1296.
International Preliminary Report on Patentability, PCT App. No. PCT/SE2016/051226, dated Jun. 20, 2019, 10 pages.
Loughney et al., "Context Transfer Protocol (CXTP)", Network Working Group, Request for Comments: 4067, Jul. 2005, pp. 1-33.
Stuedi et al., "WhereStore: Location-based Data Storage for Mobile Devices Interacting with the Cloud", MCS'10, Proceedings of the 1st ACM Workshop on Mobile Cloud Computing & Services: Social Networks and Beyond, Jun. 15, 2010, 8 pages.

* cited by examiner

METHOD AND MIGRATION MANAGING MODULE FOR MANAGING A MIGRATION OF A SERVICE

CROSS-REFERENCE TO RELATED APPLICATIONS

This application is a National stage of International Application No. PCT/SE2016/051226, filed Dec. 7, 2016, which is hereby incorporated by reference.

TECHNICAL FIELD

Embodiments herein relate to wireless communication systems, such as telecommunication networks. In particular, a method and a migration managing module for managing a migration of a service being used by a mobile device over a radio access network are disclosed. A computer program and a computer program carrier, corresponding thereto, are also disclosed.

BACKGROUND

A telecommunication network is often used to access a service, such as a service for streaming of video and/or audio, a service performing language translation or the like. Generally, the service, which is operated by a so called content provider, may execute a certain function and/or may provide content to a user equipment, such as a cellular phone or the like. The services are often located in a so called cloud, such as a data and/or computer center. However, due to changing demands on the services, there has emerged technologies for placing services and/or content closer to the user equipment, e.g. in a base station of the telecommunication network. One such technology is referred to as Mobile-Edge Computing (MEC). MEC offers the content provider cloud-computing capabilities at an edge of the telecommunication network, i.e. in the base station(s) of the telecommunication network. MEC is characterized by low latency and high bandwidth as well as real-time access to radio network information that can be leveraged by services.

A known telecommunication system, such as a Long Term Evolution (LTE) system or the like, comprises a core network, an Internet and Multimedia Subsystem (IMS), a radio access network, including one or more base stations. In this context, a cloud system may utilize resources, at least in part, in any part of the telecommunication system, such as the radio access network, the core network and/or the IMS. This means for example that a base station of the telecommunication system serves as a computing resource within the cloud system. Other resources are storage, network capability and the like. A server of the cloud system, typically providing a service, renders content for the user equipment, and/or pre-fetch video, webpages, mails or the like. The cloud system can place the server in the base station, while the base station is a computing resource of the cloud system, in order to put data close to the user equipment and in order to make interaction with the service from the user equipment better, i.e. shorter latency, higher bitrate or the like. In this manner, performance in terms of user experience may be improved.

In order to maintain performance, the server and/or the service need(s) to move as the user equipment moves, or is handed-over, between base stations within the telecommunication network.

However, in existing cloud systems it is often desired to avoid that the server, or cloud server, moved, mainly because of large volume of data to transfer. Here, data may refer to code for performing a function, user content, audio-/video-files or the like. An act of moving the server from a first set of resources, such as a first base station, to a second set of resources, such as a second base station, is commonly referred to as migration of the service and/or the service. A problem of avoiding migration of the server/service between base stations is that performance, e.g. in terms of latency, may degrade. Degraded performance is severe for application with strict real-time requirements, such as augmented reality, online gaming, base station assisted video streaming, etc.

Nevertheless, some known technologies have been developed to enable the cloud system to adapt e.g. networked storage to conditions related to the server and/or service. For example, a service may use networked storage, as part of the cloud system mentioned above. The networked storage may be organized in a hierarchical manner that allows data to be stored locally, e.g. close to or at the base station, when deemed beneficial, and that allows data to be stored centrally, when deemed beneficial.

It shall be acknowledged that for telecommunication networks a Context Transfer Protocol (CXTP) has been specified in Request For Comments (RFC) 4067 provided by Internet Engineering Task Force (IETF). The CXTP allows for transferring a state of the user equipment from one base station to another base station in connection with a handover.

As mentioned above, a server and/or a service may be migrated from one base station to another. A volume of data that needs to be transferred in order to perform the migration may be very large, e.g. from KBs up to GBs. Therefore, it may not be straightforward to apply CXTP also for servers and/services since the migration of the server and/or the service requires a lot of more resources and a lot more time comparing to a transfer of a state of the user equipment in connection with a radio handover.

SUMMARY

In view of the above, an object may hence be to handle migration of a service used by a user equipment when the user equipment moves around in a wireless communication network, such as a telecommunication network of the above mentioned kind.

According to an aspect, the object is achieved by a method, performed by a migration managing module, for managing a migration of a service being used by a mobile device over a radio access network. The migration managing module is configured with information about servers. The information about the servers comprises a respective server location measure for each server. The servers comprise a source server on which the service is executed. The radio access network comprises radio network nodes. Each radio network node of the radio network nodes is associated with a respective radio network node location measure. The migration managing module determines a point in time relating to completion of the migration of the service based on resource requirements related to the service. Moreover, the migration managing module determines a set of probability values associated with a set of radio network node of the radio access network. Each probability value of the set of probability values indicates probability of the mobile device being served, at the point in time, by a respective radio network node of the set of radio network nodes. For each radio network node of the set of radio network nodes, the migration managing module estimates a respective impact on a quality of the service. The respective impact on the quality is estimated while assuming the mobile device being served by said each radio network node. For said each radio network node, the migration managing module selects, from among the servers, at least one respective target server for which the respective server location measure of said at least one respective target server matches the respective radio network node location measure of said each radio network node, thereby obtaining a set of target servers comprising said at least one respective target server for said each radio network node. Furthermore, for each target server of the set of target servers, the migration managing module determines a respective cost of the migration based on the resource requirements related to the service. For said each target server, the migration managing module determines a respective tendency as a function of said each probability value, the respective cost and the respective impact, thereby obtaining a set of tendencies comprising the respective tendency for said each target server. Next, the migration managing module selects a target server of the set of target servers based on the set of tendencies. Then, the migration managing module performs the migration of the service from the source server to the target server.

According to another aspect, the object is achieved by a migration managing module configured for managing a migration of a service being used by a mobile device over a radio access network. The migration managing module is configured with information about servers. The information about the servers comprises a respective server location measure for each server. The servers comprise a source server on which the service is executed. The radio access network comprises radio network nodes. Each radio network node of the radio network nodes is associated with a respective radio network node location measure. The migration managing module is configured for determining a point in time relating to completion of the migration of the service based on resource requirements related to the service. Moreover, the migration managing module is configured for determining a set of probability values associated with a set of radio network node of the radio access network. Each probability value of the set of probability values indicates probability of the mobile device being served, at the point in time, by a respective radio network node of the set of radio network nodes. The migration managing module is configured for estimating a respective impact on a quality of the service for each radio network node of the set of radio network nodes. The respective impact on the quality is estimated while assuming the mobile device being served by said each radio network node. Furthermore, the migration managing module is configured for selecting, from among the servers and for said each radio network node, at least one respective target server for which the respective server location measure of said at least one respective target server matches the respective radio network node location measure of said each radio network node, thereby obtaining a set of target servers comprising said at least one respective target server for said each radio network node. The migration managing module is further configured for determining a respective cost of the migration based on the resource requirements related to the service for each target server of the set of target servers. The migration managing module is also configured for determining a respective tendency as a function of said each probability value, the respective cost and the respective impact for said each target server. In this manner, the migration managing module is configured for obtaining a set of tendencies comprising the respective tendency for said each target server. The migration managing module is configured for selecting a target server of the set of target servers based on the set of tendencies. The migration managing module is configured for performing the migration of the service from the source server to the target server.

According to further aspects, the object is achieved by a computer program and a computer program carrier corresponding to the aspects above.

As mentioned, the migration managing module determines, for each target server of the set of target servers, the respective cost of the migration based on the resource requirements related to the service. The respective cost is then used when the migration managing module determines, for said each target server, the respective tendency as the function of said each probability value, the respective cost and the respective impact. In this manner, the migration managing module obtains the set of tendencies, which may form a basis on which a decision to migrate or not migrate the service may be taken. Hence, the migration managing module selects the target server, if any, based on the set of tendencies. Thus, the migration managing module evaluates possible target servers and selects one while taking into account probability of handover, cost of migration and impact on service if no migration is performed.

An advantage is that the service is moved with the user equipment as the user equipment moved while taking into account probability of handover, cost of migration and impact on service as mentioned above. In this manner, e.g. services, in particular real-time service, are expected to be migrated while reducing, or even eliminating, service interruption due to handovers or the like.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
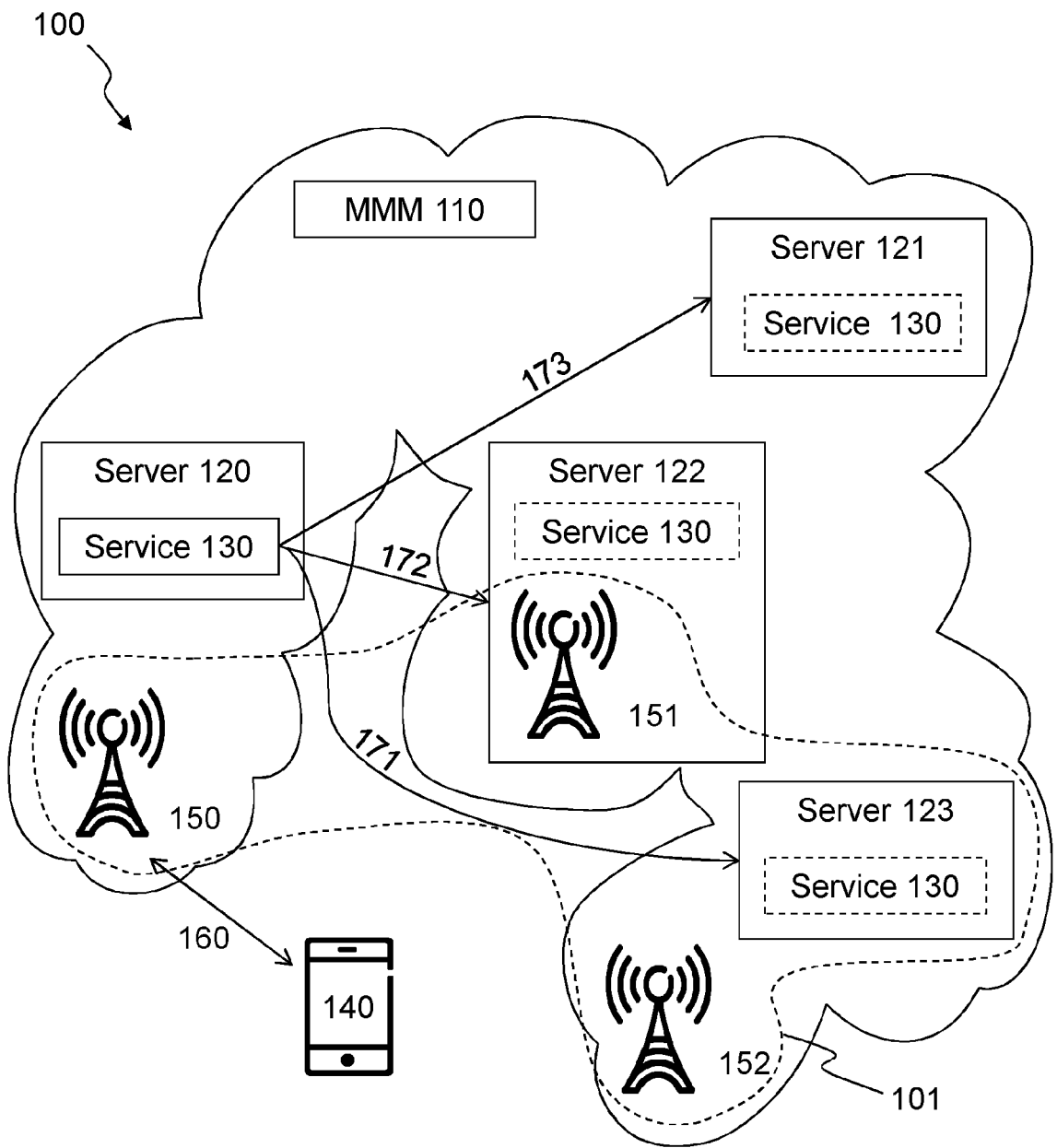
FIG. 1 is a schematic overview of an exemplifying system in which embodiments herein may be implemented.

Throughout the following description similar reference numerals have been used to denote similar features, such as nodes, actions, modules, circuits, parts, items, elements, units or the like, when applicable. In the Figures, features that appear in some embodiments are indicated by dashed lines.

In order to further emphasize on problems related to CXTP, which was mentioned in the background section, it deserves to be mentioned that a live-migration at handover may not be possible due to size of data to be migrated from a source base station to a target base station, which would cause that a service cannot be moved fast enough to the target base station, or in the vicinity thereof. Hence, an interruption in the service may occur. Moreover, if it were to be attempted that a user equipment should be continuously served by the service when located at the source base station, while the service is being set up at the target base station, it may very well happen that the service is interrupted.

FIG. 1 depicts an exemplifying system 100 in which embodiments herein may be implemented. The system 100 may be a cloud system, such a data center, a cloud computing network, a cloud network, an operator cloud, a conventional data center, a computing and storage center, a disaggregated hardware system or the like.

The system may comprise a radio access network 101 or at least portions thereof. The radio access network 101 in this example an evolved UMTS Terrestrial Radio Access Network (eUTRAN), where UMTS stands for Universal Mobile Telecommunications System.

In other examples, the radio access network 101 may be any cellular or wireless access network related to e.g. UMTS, Worldwide Interoperability for Microwave Access (WiMAX), LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, Wi-Fi networks, Worldwide Interoperability for Microwave Access (WiMAX), 5G system or the like.

The system 100 may be said to comprise a migration managing module 110 for managing a migration of services between servers 120-123 of the system 100.

A source server 120 hosts a service 130 being used by, e.g. serving, a mobile device 140 over the radio access network 101.

The servers 120-123 may comprise at least one of virtual servers and physical machines. The virtual servers may be allocated on demand in case the system 100 comprises the disaggregated hardware system, such as Hyperscale Cloud or the like. In case the system is a conventional data center, the physical machines may typically refer to stand-alone fully functional computers, which may be coordinated to handle applications/services to be executed in the system 100.

The service 130 may be provided by an application executable on any one of the servers 120-123. The service 130 may for example be a streaming service providing audio and/or video, a voice-recognition service for providing e.g. translation, editable-text or similar, a command to enable voice activated control of applications or the like.

Furthermore, a set of radio network nodes 150-152 are shown in FIG. 1. The radio access network 101 may comprise the radio network nodes 150-152.

As mentioned above, the system 100 comprises at least some parts of the radio access network 101. This may e.g. mean that resources of the radio network nodes 150-152 may constitute a portion of those resources that the system 100 handles for purposes of making the system 100 efficient.

The resources of the system 100 may be divided into one or more pools, where there may be computing pools, storage pools, network interface pools or the like. This may in particular apply in case the system 100 is the disaggregated hardware system. The computing pools may include resource in the form of processing units, such as processor, processing cores or kernels and the like. The storage pools may include memory pools, disk pools and the like. Typically, memory pools include various types of random access memory, flash memory, solid state memories or the like. Whereas disk pools typically include hard disks, magnetic tape, etc. In case the system 100 is the conventional data center, the resources may still be divided into pool, but a particular pool may more typically comprise a number of physical servers, which may be general purpose computers or may be special purpose computers e.g. directed towards providing computing capacity, memory capacity, network interface capacity or the like similarly to the pools mentioned above.

The resources may be organized into a hierarchical structure based on a resource location measure, e.g. geographical location, a measure of distance to an edge of the radio access network 101, etc. In such hierarchical structure, a higher level corresponds to a more centralized location, i.e. far away for the edge of the radio access network 101 and a lower level corresponds to a more peripheral location, i.e. relatively close to the edge of the radio access network 101. With this in mind, it is shall be noted that at least some resources of the radio access network 101 constitute a sub-set of the resources of the system 100 as a whole.

As an example, a server location measure for the source server 120, be it a virtual server or a physical machine, may be given by the resource location measure that forms the source server 120. Typically, in case of the conventional data center, the server location measure corresponds, e.g. equals to, the resource location measure for a particular physical machine that acts as the source server 120. However, in case of the disaggregated hardware system, the server location measure may be given by, e.g. as a weighted average of, a summation of, a product of etc., the resource location measures of the resources that forms a particular virtual server that acts as the source server 120. This means that each server 120-123 is associated with a respective server location measure, where each respective server location measure may be comprised among a set of server location measures. As a consequence, the servers are also organized into a hierarchical structure based on the set of server location measures.

When the service 130 is migrated within the system 100, it may be migrated in a horizontal manner 171, 172 and/or in a vertical manner 173, e.g. with respect to the hierarchical structure. The system 100 may for example comprise a first server on which the service 130 resides. A server location measure for the first server may be determined, as briefly described above, based on resource location measures of each resource that make up, or forms, the server. For example, a high value of the server location measure may correspond to a centrally located server, i.e. at a high level in the hierarchical structure. On the one hand, if the service 130 resides on a centrally located server, it is expected that handovers of the mobile device 140 at the edge of the radio access network 101 will not significantly impact quality of the service 130. On the other hand, if the service resides on a peripherally located server, e.g. the server has a low value of the server location measure and the server is thus located at a low level in the hierarchical structure, handovers of the mobile device 140 may very well significantly impact quality of the service 130. Peripherally may refer to a vicinity of the edge of the radio access network 101.

The aforementioned mobile device 140 may be served by the service 130, which may be considered to be an instance of the also mentioned application. As an example, it may be that there is one instance for the service 130 for each mobile device in case multiple mobile devices (not shown) are present in the radio access network 101.

In general, it may be preferred to push the service 130, e.g. the instance thereof, towards the edge of the radio access network 101 to improve performance, i.e. the service 130 may preferably be executed at, or by, a source radio network node 150 currently being associated with, e.g. serving, the mobile device 140.

The radio network nodes 150-152 may communicate 160 with the mobile device 140. This communication may include user transmissions and/or control transmissions. The user transmissions may include user data, payload data, content data etc. The control transmissions may include control information relating to e.g. scheduling, authentication, mobility, power control etc. The user transmissions are only relevant in case the first wireless device is in a cellular mode. The communication may include uplink transmission and/or downlink transmission. A transmission may be referred to as a data block.

As used herein, the term "radio network node" may refer to a Base Station System (BSS), a Radio Network Controller (RNC), a Radio Base Station (RBS), an evolved Node B (eNB), a control node controlling one or more Remote Radio Units (RRUs), an access point or the like.

As used herein, the term "mobile device" may refer to a wireless communication device, a user equipment, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Figure 2:
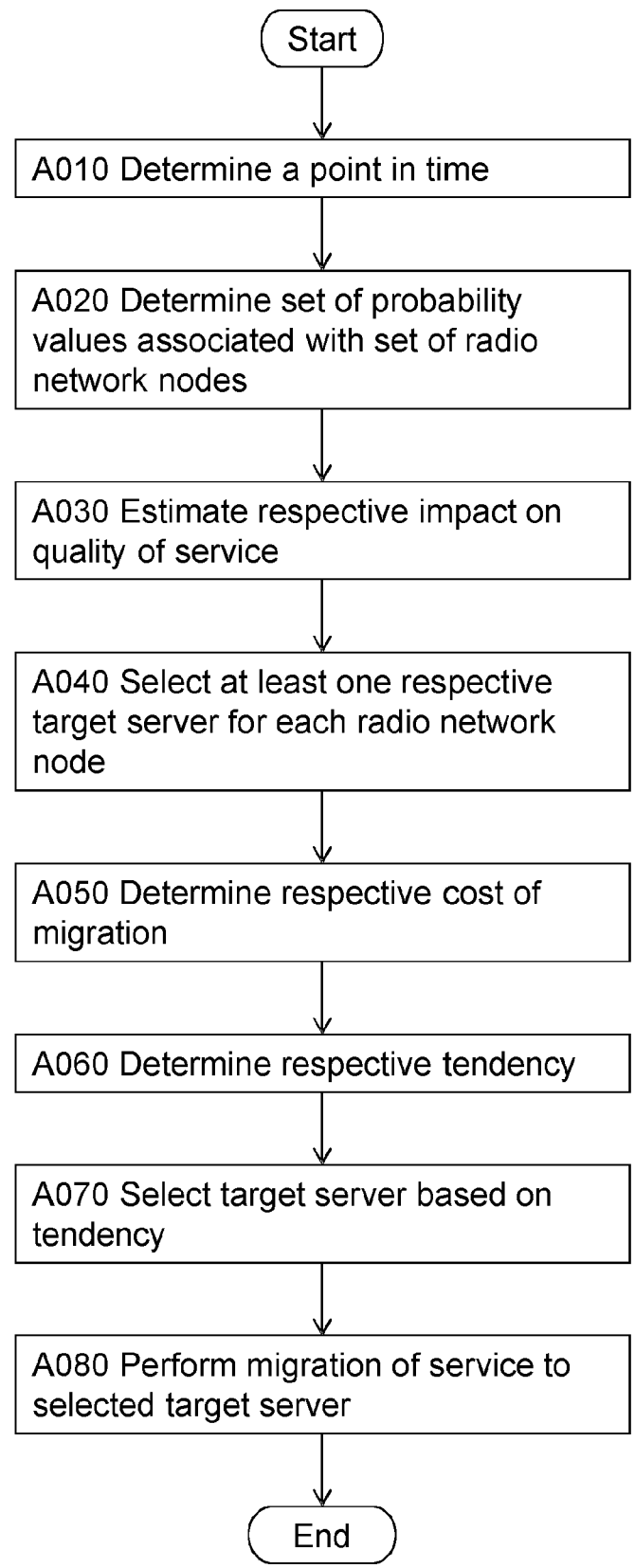
FIG. 2 is a flowchart illustrating embodiments of the method in the migration managing module.

FIG. 2 illustrates an exemplifying method according to embodiments herein when implemented in the system 100 of FIG. 1.

The migration managing module 110 performs a method for managing a migration of a service 130 being used by a mobile device 140 over a radio access network 101.

The migration managing module 110 is configured with information about servers 120-123. The information about the servers 120-123 comprises a respective server location measure for each server 120-123. The respective server location measure may comprise at least one of geographical coordinates, an identity of a physical machine on which a respective server 120-123 among the servers 120-123 resides, an indication of delay between each of the servers 120-123 and the mobile device 140, an indication relating to network topological location of the servers 120-123 or the like. Briefly, network topological location refers to a physical or a logical position of a node in a network. Network topology thus defines a manner in which different nodes, such as the servers and the radio network nodes, of the network are placed and interconnected with each other. Common network topologies include e.g. star, tree, mesh, bus or the like.

Typically, the geographical coordinates are given as latitude and longitude. The network topological location may be expressed as a value indicating horizontal and/or vertical location in the hierarchical structure.

The migration managing module 110 may have the possibility to map the identity of a physical machine, related to each server 120-120, to geographical coordinates, e.g. through access of a data base including mapping from identities to geographical coordinates or a similar means.

In general, the information about the servers 120-123 indicates a topology, or hierarchical structure, based on the respective server location measures, which as mentioned may be expressed in terms of geographical distance, delay or the like.

As mentioned, the servers 120-123 comprise the source server 120 on which the service 130 is executed.

The radio access network 101 comprises radio network nodes 150-152. Each radio network node 150-152 of the radio network nodes 150-152 is associated with a respective radio network node location measure. The respective radio network node location measure may comprise at least one of geographical coordinates, an identity of a physical machine on which the radio network node 150-152 resides, an indication of delay between each of the radio network nodes 150-152 and the mobile device 140, an indication relating to network topological location of the radio network nodes 150-152, or the like. The same or similar explanations as for the servers apply also for the radio network nodes in view of the radio network node location measure. However, it is in particular noted that the migration managing module 110 may have the possibility to map the identity of a physical machine, related to each radio network node, to geographical coordinates, e.g. through access of a data base including mapping from identities to geographical coordinates or a similar means.

As mentioned, the service 130 may be provided by an application executable on any one of the servers 120-123. In some embodiments, the application is executing on the source server 120 before the migration. In some embodiments, the application is executing on the target server 121-123 after the migration.

One or more of the following actions may be performed in any suitable order.

As mentioned, the mobile device 140 may initially be served by the source radio network node 150. Furthermore, the service 130 serving the mobile device 140 may be hosted on the source server 120.

Action A010

The migration managing module 110 determines a point in time relating to completion of the migration of the service 130 based on resource requirements related to the service 130.

The resource requirements related to the service may comprise at least one of memory requirements for execution of the service 130, storage requirements for holding data relating to the service 130, computing requirements for execution of the service 130, and bandwidth requirements for providing the service 130 to the mobile device 140. The storage requirements, related to the storage pools, may indicate requirements for memory, disk and the like. Typically, memory include various types of random access memory, flash memory, solid state memory or the like. Whereas disk typically includes hard disks, magnetic tape, etc.

As a result of this action, the migration managing module 110 may use the point in time in action A020 below.

Action A020

The migration managing module 110 determines a set of probability values associated with a set of radio network node 150-152 of the radio access network 101. Each probability value of the set of probability values indicates probability of the mobile device 140 being served, at the point in time, by a respective radio network node 150-152 of the set of radio network nodes 150-152.

In this manner, the migration managing module 110 may find out likelihood of that the mobile device 140 is served by any one of the radio network nodes 150-152 at the point in time. As an example, this action may be performed by a radio handover prediction module that is described in more detail with reference to FIG. 3 below.

Action A030

For each radio network node 150-152 of the set of radio network nodes 150-152, the migration managing module 110 estimates a respective impact on a quality of the service 130. The respective impact on the quality is estimated while assuming the mobile device 140 being served by said each radio network node 150-152.

The estimating A030 of the respective impact may be performed while the service 130 is continuously executed on the source server 120.

The respective impact may indicate degradation of the service 130 per unit time. The degradation may be directly proportional to bitrate of transmissions between the mobile device 140 and the service 130.

As an example, this action may be performed by a service impact estimation module that is described in more detail with reference to FIG. 3 below.

Action A040

The migration managing module 110 selects from among the servers, for said each radio network node 150-152, at least one respective target server 121-123 for which the respective server location measure of said at least one respective target server 121-123 matches the respective radio network node location measure of said each radio network node 150-152, thereby obtaining a set of target servers 121-123 comprising said at least one respective target server 121-123 for said each radio network node 150-152.

As an example, assuming that the respective server location measure and the respective radio network node location measure is given by geographical coordinates, geographical coordinates for each server may be said to match geographical coordinates for said each radio network node 150-152 when the geographical coordinates for each server indicates a position than is within a certain distance from a position indicated by the geographical coordinates for said each radio network node 150-152.

The respective server location measure may, additionally or alternatively, be given by the indication of delay, where similar indications of delay, e.g. within a certain range, may identify matching of the respective server location measure and the respective radio network node location measure.

Action A050

The migration managing module 110 determines, for each target server 121-123 of the set of target servers 121-123, a respective cost of the migration based on the resource requirements related to the service 130.

As an example, this action may be performed by a server migration cost estimation module that is described in more detail with reference to FIG. 3 below.

In one example, the respective cost of the migration is directly proportional to the resource requirements in terms of storage required for the service 130.

In other examples, the respective cost of the migration may be dependent on network load and/or network congestion expected to be caused by migration to said each target server 121-123. That is to say, when backend network becomes congested and/or heavily loaded due to the migration, the respective cost of the migration is considered to increase, or be higher.

Action A060

The migration managing module 110 determines, for said each target server 121-123, a respective tendency as a function of said each probability value, the respective cost and the respective impact, thereby obtaining a set of tendencies comprising the respective tendency for said each target server 121-123.

The function may define the respective tendency as directly proportional to said each probability value and the respective impact, and the function may further define the respective tendency as inversely proportional to the respective cost.

As an example, this action may be performed by a service placement decision module that is described in more detail with reference to FIG. 3 below. Notably, the service placement decision module may also perform other actions.

Action A070

The migration managing module 110 selects a target server 121-123 of the set of target servers 121-123 based on the set of tendencies.

The target server 121-123 may be selected in various manners as follows.

In one example, the migration managing module 110 may select the target server 121-123 by selecting the target server 121-123 for which the respective tendency is among the greatest tendencies of the set of tendencies. In particular, the target server 121-123 with a maximum tendency among the set of tendencies may be selected. This means that the selecting A070 of the target server 121-123 may comprise selecting the target server 121-123 for which the respective tendency is among the greatest tendencies of the set of tendencies.

In another example, the migration managing module 110 may select the target server 121-123 by selecting the target server 121-123 for which the respective tendency is above a threshold value for tendency of migration. The threshold value may be an absolute value predetermined value and/or a relative value determined based on the set of tendencies, e.g. as mean of tendencies, a given percentile of the tendencies, highest quartile of the tendencies or the like. This means that the selecting A070 of the target server 121-123 may comprise selecting the target server 121-123 for which the respective tendency is above a threshold value for tendency of migration.

Additionally or alternatively, the migration managing module 110 may select the target server 121-123 by selecting only those target servers that have enough available resources, e.g. in terms of memory, computing capacity, etc., to be able to host the service. This means that the selecting A070 of said at least one target server 121-123 may comprise selecting said at least one target server 121-123 based the resource requirements related to the service 130.

As an example, this action may be performed by a service placement decision module that is described in more detail with reference to FIG. 3 below. Notably, the service placement decision module may also perform other actions.

Action A080

The migration managing module 110 performs the migration of the service 130 from the source server 120 to the target server 121-123.

As described above, based on the set of tendencies, the method herein predictively and actively performs the migration of the service 130 while utilizing resources of radio network nodes for providing the target server 121-123. In this manner, it may be predicted to where the mobile device 140 moves, and then actively prepare the target server, e.g. in a target radio network node, i.e. the radio network node that the mobile device 140 is handed over to. Expressed differently, the method performs the migration based on predicting potential movement of the mobile device, cost of server migration, and impact on service if no migration is performed.

It shall be noted that the migration of the service 130 may include migration of executable code, resources used for execution, user session context, user caches, audio/video content or the like.

An advantage is that service responsiveness, e.g. time for response, bit rate, may be improved thanks to that service interruption due to movement of the mobile device may be avoided. Additionally, the migration managing module 110 may select the target server while making a trade-off between probability relating to handover, impact of service and cost of migration. In this manner, unnecessarily migration of the service may be avoided.

Services may prioritize migration differently. For example, services with very strict requirements on latency, such as Vehicle-To-Vehicle crash alarm reporting, may have a lower value of the threshold value for tendency of migration than other services.

Some examples of services that may benefit from a local cloud in the radio network node, i.e. the cloud system 100 may utilize resources also in the radio network nodes:

Personal assistant in cloud need to perform complex artificial intelligent computing based on the input events from mobile device.

Simultaneous interpreting requires low latency and complicated data processing, like voice recognition, context interpreting, and sound composing.

Virtual reality/Augmented reality rendering in cloud requires low latency and heavy image processing.

Vehicle-To-Vehicle applications put very high requirements on the connectivity. Both the availability must be higher and the delay needs to be reduced compared to today's mobile systems. Examples of applications are:
Car crash alarm reporting
Velocity control e.g. fixed distance between cars Industrial campus process where multiple production equipments needs to communicate between each other, to a central control, logistics and to the facilities storage Indoor LTE
Devices in a building that needs to share high of volume data e.g. surveillance cameras, television sets, monitors, washing machines, electrical meters.

Figure 3:
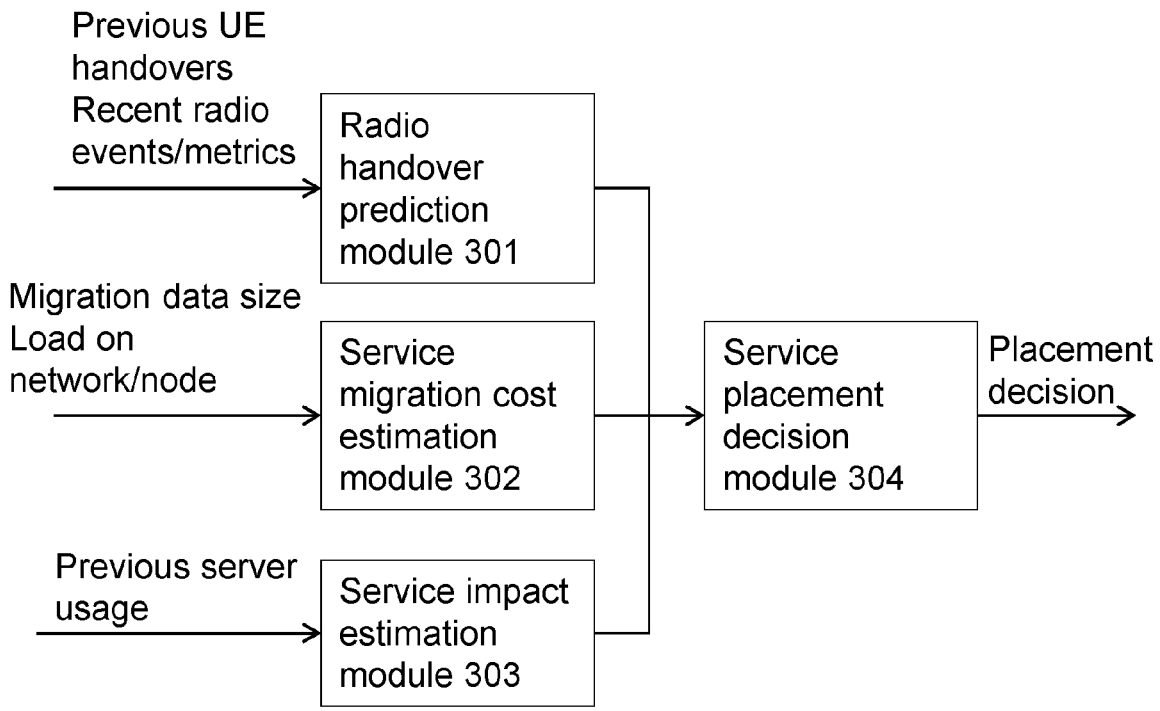
FIG. 3 is a block diagram illustrating exemplifying modules for implementing the migration managing module.

Device-To-Device
video cameras, projectors, consoles, mobile phones, heart meters, training monitors FIG. 3 illustrates an exemplifying migration managing module 110 comprising a radio handover prediction module 301, a server migration cost estimation module 302, a service impact estimation module 303 and a service placement decision module 304.

Based on outputs from the three first mentioned modules, the service placement decision module 304 may decide if and/or where the service may be actively prepared in one or more target servers.

Generally, when predicting that the mobile device may be subject to a handover, service related data may be continuously copied into any possible target radio network node. When the handover takes place, server migration will also be concluded with committing a delta part of the data, i.e. the most recent data not already copied. Potentially, data could be copied to multiple targets when movement of the mobile is uncertain. But an actual migration of the service only happens when the mobile device eventually is handed over to the predicted target radio network node. In case the mobile device is not handed over to the predicted radio network node, the service simply continues to run on the source server. Already migrated data related to the service may be kept until expired.

Radio Handover Prediction Module

The radio handover prediction module 301 predicts where the mobile device 140 is expected to move.

An output of radio handover estimation module is the set of probability values indication the probability that the mobile device 140 will perform a radio handover to different target radio network nodes in a specified time period, e.g. as given by the point in time. The specified time period may be the time required for the service 130 to be migrated to any target server 121-123. For example, if the migration takes 10 seconds, then the system 100, e.g. the migration managing module 110, may need 10 seconds to prepare and perform the migration. The system 100 may then need the probability values for the radio network nodes that the mobile device 140 have been handed over to in 10 seconds. An example is shown in Table 1, where with 50% probability the mobile device 140 will perform a handover to radio network node B101 in 10 seconds, and 30% probability to radio network node B102.

Machine learning approaches may be used for this kind of prediction, with input such as previous handovers, the mobile device's most recently visited radio network nodes, or cells. In addition handover profiles of all mobile devices could be used as input for this prediction. In addition to this kind of info, radio level events can be used for the prediction. For example, when a mobile device reports to its serving base station that it hears a neighboring cell with certain radio quality, this kind of information can also be used for the prediction.

User profiles including movement patterns, handover activities, and radio layer information are possible inputs of the prediction. Based on the prediction, the cloud server can be actively prepared in targeting base station(s).

TABLE 1

| Output/input related to handover estimation module | | |
|---|---|---|
| Radio network node | Probability | Time threshold |
| B101 | 0.5 | 10 s |
| B102 | 0.3 | 10 s |

Server Migration Cost Estimation Module

Figure 4:
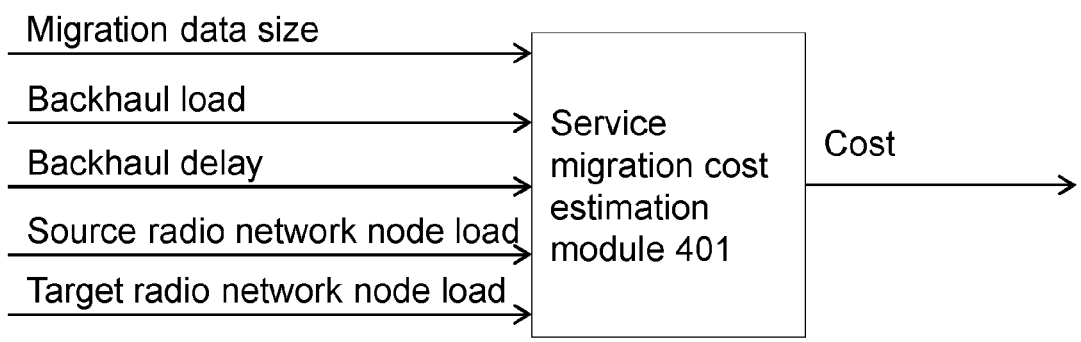
FIG. 4 is a further block diagram illustrating an exemplifying migration cost estimating module.

With reference to FIG. 4, the server migration cost estimation module 401 estimates cost of migration e.g. in terms of at least one of time, resource requirements related to the service, network and computing load for performing the migration or the like.

An input may be amount of data that need to be transferred from the source server, such as the source radio network node, to the target server, such as the target radio network node(s). Notably, in some examples, a radio network node corresponds to a server. However, in some examples, one radio network node may host a portion of a server or even one or more servers. Additionally, it may be that the target server is not hosted by the target radio network node at all. Instead, the target server is only hosted in the vicinity of the target radio network node, where the location measures of the target server and the target radio network node, respectively, is used to match them together.

In case it is not a live migration, this data may include disk data, memory, CPU state, etc. If it is off-line migration, the cost also includes collection of session states from applications and reestablishment of the session in the target radio network node, and is also depend on load on the source and target radio network nodes. Additional input may be the available backhaul capacity between the source and target server. Finally, backhaul delay and time required for performing the handover may also be used as input to the server migration cost estimation module 302.

The cost may also depend on use case. Estimated time consumption for performing the migration may range from 100 ms to minutes, and estimated amount of data may range from KBs up to GBs.

An exemplifying formula for estimation of the cost may be found as: Server Migration Cost=P1*data size+P2*Backhaul load+P3*Backhaul delay+P4*source radio network node load+P5*target radio network node load, where P1 to P3 and P5 are weight parameters, and should in general be positive. Notably, P4 is typically negative.

Data size: size of service in terms of storage requirements

Backhaul load: Load on connection between source and target radio network node and/or source and target server Backhaul delay: Delay on connection between source and target radio network node and/or source and target server Source radio network node load: Current load on source radio network node and/or source server Target radio network node load: Current load on target radio network node and/or target server.

Since the migration may be horizontal or hierarchical with different targets alternative cost estimations may need to be performed for each possible target.

Service Impact Estimation Module

The service impact estimation module 303 may estimate the potential impact on the service if no migration is performed.

The service impact estimation module monitors usage of the service, and provides a measure of impact per time unit for not performing migration of the service or possibly performing the migration of the service after handover. The impact is a measure of service degradation per time unit, where the impact may be service dependent. For non-migration case, if the mobile device is accessing the service frequently, the impact may be quite high, while if the mobile device is not accessing the service very frequently, the impact is expected to be low. For a lazy-migration case, i.e. migrating the service after handover, impact is similar to non-migration with an addition: a time duration required for migration. This is because during migration, the mobile device is served by the service while the service still resides on the source server. Longer time duration for migration means higher cost.

In general, for real time services, the cost for not performing cloud server migration is significantly higher than low priority background services!

Examples of the impact for not performing service migration. Here, the impact is quantifies as low, medium, and high, but it is of course contemplated that the impact may be quantified by any values, such as:

1, 2 and 3,

A, B and C, 10, 20 and 30, etc.

| Service type | Time since last access | Impact |
|---|---|---|
| Delay sensitive service | 10 s | High |
| Service that is less delay sensitive (e.g. video camera to cloud storage) | >10 minutes | Low |

Service Placement Decision Module

The service placement decision module 304 may decide whether or not to prepare and perform migration of the service, from the source server to the target server, which sometime may be realized by the target radio network node, by continuously evaluating outputs from the three modules mentioned above. The service migration may relate to initial service placement and/or migration of service due to e.g. handover.

For the initial service placement, the prediction may not be that accurate due to lacking history for the mobile device, data related to the service may be placed at a higher level in the hierarchical structure of resources. After the mobile device becomes active, the prediction is expected to become more and more accurate. The service is preferably be pushed the edge of the system. However, if prediction is accurate enough, the service may be placed at a good location from the beginning.

After initial placement, the system continuously predicts movement of the mobile device and determines the set of tendencies for each expected target server as:

Tendency=(handover probability)*(service impact)/(Migration cost)

The tendency may be compared to a threshold value. The threshold value for tendency of migration may be determined based on service type and/or type of user. Different service types may have different requirements concerning e.g. latency, memory requirements, bandwidth or the like. Likewise, different types of users, such as Very-Important-Person (VIP) users, gold subscribers, silver subscribers, bronze subscribers and the like, a may have different requirements concerning e.g. latency, memory requirements, bandwidth and the like. Typically, the different types of users have different quotas associated with their subscription-plans as negotiated with an operator. The service placement decision module may consider this by retrieving properties from applications, connecting to the service, of the mobile device. For mobile devices with multiple applications active, there may be cases where only the applications for the most critical services are respected.

Service impact and migration cost may need to be unified to improve results. Based on the output of the formula above, different migration strategies might be applied:

No migration, this is applied when many target servers end up with similar tendency and they are locate close to the source server. This may happen when the mobile device keeps moving around, e.g. a mobile device in a taxi is likely to keep travelling around city all the time. In this case, a solution may be to place the service in at a server in a higher level of the system, thus avoiding migration due to handovers between radio network nodes.

Horizontal migration, as migration 171, 172 in FIG. 1. This is applied when there is single target server or single target radio network node that outruns others. This may happen when the mobile device moves between an office and a home in a working day.

Hierarchical migration, as migration 173 in FIG. 1. This is applied when a couple of target servers get high tendency, but no obviously leading target server. This may happen when the mobile device goes from a stationary state into a mobility state, e.g. a traveler finally gets onboard a high speed train after a long waiting in railway station.

When tendency reach a threshold, the system will order the source server to initiate migration by starting to copy data in advance of a handover of the mobile device. A delta of the data is copied and migration is committed when the mobile device is actually handed over.

Figure 5:
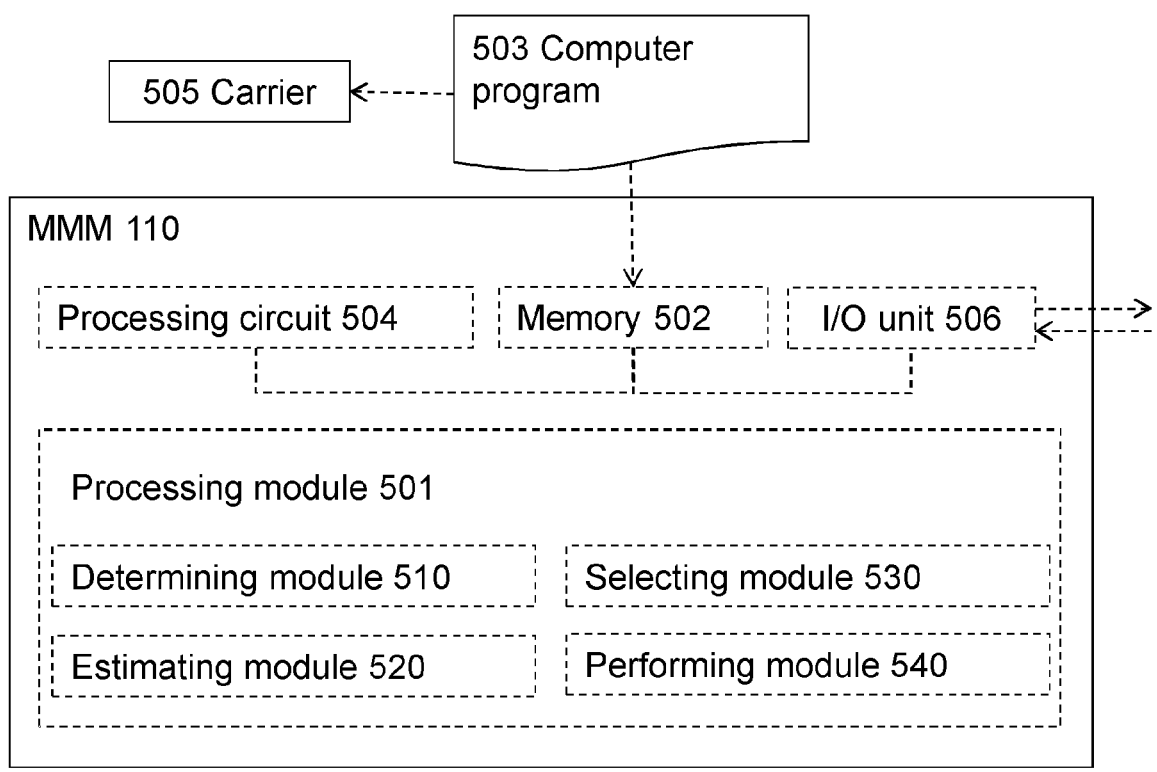
FIG. 5 is a yet further block diagram illustrating embodiments of the migration managing module.

With reference to FIG. 5, a schematic block diagram of embodiments of the migration managing module 110 of FIG. 1 is shown.

The migration managing module 110 may comprise a processing module 501, such as a means for performing the methods described herein. The means may be embodied in the form of one or more hardware modules and/or one or more software modules The migration managing module 110 may further comprise a memory 502. The memory may comprise, such as contain or store, instructions, e.g. in the form of a computer program 503, which may comprise computer readable code units.

According to some embodiments herein, the migration managing module 110 and/or the processing module 501 comprises a processing circuit 504 as an exemplifying hardware module, which may comprise one or more processors. Accordingly, the processing module 501 may be embodied in the form of, or 'realized by', the processing circuit 504. The instructions may be executable by the processing circuit 504, whereby the migration managing module 110 is operative to perform the methods of FIG. 2. As another example, the instructions, when executed by the migration managing module 110 and/or the processing circuit 504, may cause the migration managing module 110 to perform the method according to FIG. 2.

In view of the above, in one example, there is provided a migration managing module 110 configured for managing a migration of a service 130 being used by a mobile device 140 over a radio access network 101. As mentioned, the migration managing module 110 is configured with information about servers 120-123. The information about the servers 120-123 comprises a respective server location measure for each server 120-123. The servers 120-123 comprise a source server 120 on which the service 130 is executed. The radio access network 101 comprises radio network nodes 150-152. Each radio network node 150-152 of the radio network nodes 150-152 is associated with a respective radio network node location measure. Again, the memory 502 contains the instructions executable by said processing circuit 504 whereby the migration managing module 110 is operative for:

determining a point in time relating to completion of the migration of the service 130 based on resource requirements related to the service 130, determining a set of probability values associated with a set of radio network node 150-152 of the radio access network 101. Each probability value of the set of probability values indicates probability of the mobile device 140 being served, at the point in time, by a respective radio network node 150-152 of the set of radio network nodes 150-152, for each radio network node 150-152 of the set of radio network nodes 150-152, estimating a respective impact on a quality of the service 130. The respective impact on the quality is estimated while assuming the mobile device 140 being served by said each radio network node 150-152, for said each radio network node 150-152, selecting, from among the servers, at least one respective target server 121-123 for which the respective server location measure of said at least one respective target server 121-123 matches the respective radio network node location measure of said each radio network node 150-152, thereby obtaining a set of target servers 121-123 comprising said at least one respective target server 121-123 for said each radio network node 150-152, for each target server 121-123 of the set of target servers 121-123, determining a respective cost of the migration based on the resource requirements related to the service 130, for said each target server 121-123, determining a respective tendency as a function of said each probability value, the respective cost and the respective impact, thereby obtaining a set of tendencies comprising the respective tendency for said each target server 121-123, selecting a target server 121-123 of the set of target servers 121-123 based on the set of tendencies, and performing the migration of the service 130 from the source server 120 to the target server 121-123.

FIG. 5 further illustrates a carrier 505, or program carrier, which comprises the computer program 503 as described directly above.

In some embodiments, the migration managing module 110 and/or the processing module 501 may comprise one or more of a determining module 510, an estimating module 520, a selecting module 530, and a performing module 540 as exemplifying hardware modules. In other examples, one or more of the aforementioned exemplifying hardware modules may be implemented as one or more software modules.

The determining module 510 may comprise the radio handover prediction module 301. The determining module 510, or another determining module (not shown), may comprise the service migration cost estimation module 302. The estimating module 520 may comprise the service impact estimation module 303. The selecting module 530 may comprise the service placement decision module 304.

Moreover, the processing module 501 comprises an Input/Output unit 506, which may be exemplified by a receiving module and/or a sending module (not shown) when applicable.

Accordingly, the migration managing module 110 is configured for managing a migration of a service 130 being used by a mobile device 140 over a radio access network 101.

As mentioned, the migration managing module 110 is configured with information about servers 120-123. The information about the servers 120-123 comprises a respective server location measure for each server 120-123. The servers 120-123 comprise a source server 120 on which the service 130 is executed. The radio access network 101 comprises radio network nodes 150-152. Each radio network node 150-152 of the radio network nodes 150-152 is associated with a respective radio network node location measure.

Therefore, according to the various embodiments described above, the migration managing module 110 and/or the processing module 501 and/or the determining module 510 is configured for determining a point in time relating to completion of the migration of the service 130 based on resource requirements related to the service 130.

The migration managing module 110 and/or the processing module 501 and/or the determining module 510 is configured for determining a set of probability values associated with a set of radio network node 150-152 of the radio access network 101. Each probability value of the set of probability values indicates probability of the mobile device 140 being served, at the point in time, by a respective radio network node 150-152 of the set of radio network nodes 150-152.

The migration managing module 110 and/or the processing module 501 and/or the estimating module 520 is configured for estimating, for each radio network node 150-152 of the set of radio network nodes 150-152, a respective impact on a quality of the service 130. The respective impact on the quality is estimated while assuming the mobile device 140 being served by said each radio network node 150-152.

The migration managing module 110 and/or the processing module 501 and/or the selecting module 530 is configured for selecting from among the servers, for said each radio network node 150-152, at least one respective target server 121-123 for which the respective server location measure of said at least one respective target server 121-123 matches the respective radio network node location measure of said each radio network node 150-152, thereby obtaining a set of target servers 121-123 comprising said at least one respective target server 121-123 for said each radio network node 150-152.

The migration managing module 110 and/or the processing module 501 and/or the determining module 510 is configured for determining, for each target server 121-123 of the set of target servers 121-123, a respective cost of the migration based on the resource requirements related to the service 130.

Furthermore, the migration managing module 110 and/or the processing module 501 and/or the determining module 510 is configured for determining, for said each target server 121-123, a respective tendency as a function of said each probability value, the respective cost and the respective impact, thereby obtaining a set of tendencies comprising the respective tendency for said each target server 121-123.

The migration managing module 110 and/or the processing module 501 and/or the selecting module 530 is configured for selecting a target server 121-123 of the set of target servers 121-123 based on the set of tendencies.

Moreover, the migration managing module 110 and/or the processing module 501 and/or the performing module 540 is configured for performing the migration of the service 130 from the source server 120 to the target server 121-123.

The migration managing module 110 and/or the processing module 501 and/or the selecting module 530 may be configured for selecting the target server 121-123 by selecting the target server 121-123 for which the respective tendency is among the greatest tendencies of the set of tendencies.

The migration managing module 110 and/or the processing module 501 and/or the selecting module 530 may be configured for selecting the target server 121-123 by selecting the target server 121-123 for which the respective tendency is above a threshold value for tendency of migration.

The migration managing module 110 and/or the processing module 501 and/or the selecting module 530 may be configured for selecting said at least one target server 121-123 by selecting said at least one target server 121-123 based the resource requirements related to the service 130.

The migration managing module 110 and/or the processing module 501 and/or the estimating module 520 may be configured for estimating the respective impact while the service 130 is continuously executed on the source server 120.

The function may define the respective tendency as directly proportional to said each probability value and the respective impact, and the function may further define the respective tendency as inversely proportional to the respective cost.

The respective impact may indicate degradation of the service 130 per unit time. The degradation may be directly proportional to bitrate of transmissions between the mobile device 140 and the service 130.

The service 130 may be provided by an application executable on any one of the servers 120-123.

The resource requirements related to the service may comprise at least one of memory requirements for execution of the service 130, storage requirements for holding data relating to the service 130, computing requirements for execution of the service 130, and bandwidth requirements for providing the service 130 to the mobile device 140.

The servers 120-123 may comprise at least one of virtual servers and physical machines.

The respective radio network node location measure may comprise at least one of geographical coordinates and an identity of a physical machine on which the respective server 120-123 resides.

The respective server location measure may comprise at least one of geographical coordinates and an identity of a physical machine on which the radio network node 150-152 resides.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a migration managing module, for managing a migration of a service being used by a mobile device over a radio access network, wherein the migration managing module is configured with information about servers, wherein the information about the servers comprises a respective server location measure for each server, wherein the servers comprise a source server on which the service is executed, wherein the radio access network comprises radio network nodes, wherein each radio network node of the radio network nodes is associated with a respective radio network node location measure, wherein the method comprises:

determining a point in time relating to completion of the migration of the service based on resource requirements related to the service, determining a set of probability values associated with a set of radio network nodes of the radio access network, wherein each probability value of the set of probability values indicates probability of the mobile device being served, at the point in time, by a respective radio network node of the set of radio network nodes, for each radio network node of the set of radio network nodes, estimating a respective impact on a quality of the service, wherein the respective impact on the quality is estimated while assuming the mobile device being served by said each radio network node, for said each radio network node, selecting, from among the servers, at least one respective target server for which the respective server location measure of said at least one respective target server matches the respective radio network node location measure of said each radio network node, thereby obtaining a set of target servers comprising said at least one respective target server for said each radio network node, for each target server of the set of target servers, determining a respective cost of the migration based on the resource requirements related to the service, for said each target server, determining a respective tendency as a function of said each probability value, the respective cost and the respective impact, thereby obtaining a set of tendencies comprising the respective tendency for said each target server, selecting a target server of the set of target servers based on the set of tendencies, and performing the migration of the service from the source server to the target server.

2. The method according to claim 1, wherein the function defines the respective tendency as directly proportional to said each probability value and the respective impact, and wherein the function further defines the respective tendency as inversely proportional to the respective cost.

3. The method according to any one of the preceding claims, wherein the selecting of the target server comprises selecting the target server for which the respective tendency is among the greatest tendencies of the set of tendencies.

4. The method according to any one of the preceding claims, wherein the selecting of the target server comprises selecting the target server for which the respective tendency is above a threshold value for tendency of migration.

5. The method according to any one of the preceding claims, wherein the selecting of said at least one target server comprises selecting said at least one target server based the resource requirements related to the service.

6. The method according to any one of the preceding claims, wherein the respective impact indicates degradation of the service per unit time, wherein the degradation is directly proportional to bitrate of transmissions between the mobile device and the service.

7. The method of claim 1, wherein the service is provided by an application executable on any one of the servers.

8. The method of claim 1, wherein the resource requirements related to the service comprises at least one of memory requirements for execution of the service, storage requirements for holding data relating to the service, computing requirements for execution of the service, and bandwidth requirements for providing the service to the mobile device.

9. The method of claim 1, wherein the estimating of the respective impact is performed while the service is continuously executed on the source server.

10. The method of claim 1, wherein the servers comprise at least one of virtual servers and physical machines.

11. The method according to any one of the preceding claims, wherein the respective radio network node location measure comprises at least one of geographical coordinates and an identity of a physical machine on which the radio network node resides.

12. The method of claim 1, wherein the respective server location measure comprises at least one of geographical coordinates and an identity of a physical machine on which a respective server resides.

13. A non-transitory computer readable medium, storing instructions that when executed by a processor cause the processor to implement a migration managing module to manage a migration of a service being used by a mobile device over a radio access network, wherein the migration managing module is configured with information about servers, wherein the information about the servers comprises a respective server location measure for each server, wherein the servers comprise a source server on which the service is executed, wherein the radio access network comprises radio network nodes, wherein each radio network node of the radio network nodes is associated with a respective radio network node location measure, wherein the migration managing module is configured for:
  determining a point in time relating to completion of the migration of the service based on resource requirements related to the service,
  determining a set of probability values associated with a set of radio network nodes of the radio access network, wherein each probability value of the set of probability values indicates probability of the mobile device being served, at the point in time, by a respective radio network node of the set of radio network nodes,
  for each radio network node of the set of radio network nodes, estimating a respective impact on a quality of the service, wherein the respective impact on the quality is estimated while assuming the mobile device being served by said each radio network node,
  for said each radio network node, selecting, from among the servers, at least one respective target server for which the respective server location measure of said at least one respective target server matches the respective radio network node location measure of said each radio network node, thereby obtaining a set of target servers comprising said at least one respective target server for said each radio network node,
  for each target server of the set of target servers, determining a respective cost of the migration based on the resource requirements related to the service,
  for said each target server, determining a respective tendency as a function of said each probability value, the respective cost and the respective impact, thereby obtaining a set of tendencies comprising the respective tendency for said each target server,
  selecting a target server of the set of target servers based on the set of tendencies, and
  performing the migration of the service from the source server to the target server.

14. The non-transitory computer readable medium according to claim 13, wherein the function defines the respective tendency as directly proportional to said each probability value and the respective impact, and wherein the function further defines the respective tendency as inversely proportional to the respective cost.

15. The non-transitory computer readable medium according to claim 13, wherein the migration managing module is configured for selecting the target server by selecting the target server for which the respective tendency is among the greatest tendencies of the set of tendencies.

16. The non-transitory computer readable medium according to claim 13, wherein the migration managing module is configured for selecting the target server by selecting the target server for which the respective tendency is above a threshold value for tendency of migration.

17. The non-transitory computer readable medium according to claim 13, wherein the migration managing module is configured for selecting said at least one target server by selecting said at least one target server based the resource requirements related to the service.

18. The non-transitory computer readable medium according to claim 13, wherein the respective impact indicates degradation of the service per unit time, wherein the degradation is directly proportional to bitrate of transmissions between the mobile device and the service.

19. The non-transitory computer readable medium according to claim 13, wherein the service is provided by an application executable on any one of the servers.

20. The non-transitory computer readable medium according to claim 13, wherein the resource requirements related to the service comprises at least one of memory requirements for execution of the service, storage requirements for holding data relating to the service, computing requirements for execution of the service, and bandwidth requirements for providing the service to the mobile device.

21. The non-transitory computer readable medium according to claim 13, wherein the migration managing module is configured for estimating the respective impact while the service is continuously executed on the source server.

22. The non-transitory computer readable medium according to claim 13, wherein the servers comprise at least one of virtual servers and physical machines.

23. The non-transitory computer readable medium according to claim 13, wherein the respective radio network node location measure comprises at least one of geographical coordinates and an identity of a physical machine on which the radio network node resides.

24. The non-transitory computer readable medium according to claim 13, wherein the respective server location measure comprises at least one of geographical coordinates and an identity of a physical machine on which a respective server resides.

* * * * *